United States Patent [19]

Coryell, III

[11] 4,121,532

[45] Oct. 24, 1978

[54] SPEEDBOAT SAFETY DRIVELINE COUPLING

[76] Inventor: William Harlan Coryell, III, 11931 Gothic Ave., Granada Hills, Calif. 91344

[21] Appl. No.: 757,315

[22] Filed: Jan. 6, 1977

[51] Int. Cl.² .................... B63H 5/06; F16C 3/02; F16D 1/02
[52] U.S. Cl. ............................. 115/34 R; 64/1 S; 403/337; 403/359
[58] Field of Search ............... 403/335, 336, 337, 359; 115/34 R; 64/1 S, 9 R

[56] References Cited

U.S. PATENT DOCUMENTS

| 2,565,606 | 8/1951 | Guy | 403/335 X |
| 2,678,840 | 5/1954 | Coffing | 403/337 |
| 3,466,074 | 9/1969 | Heth | 403/337 |

FOREIGN PATENT DOCUMENTS 996,382  6/1965  United Kingdom ............... 403/337

Primary Examiner—Robert B. Reeves
Assistant Examiner—Edward M. Wacyra

Attorney, Agent, or Firm—Spensley, Horn & Lubitz

[57] ABSTRACT

This invention relates to a safety coupling such as found in boats and the like. The coupling is used to couple one shaft efficiently and safely to another flanged shaft and comprises a flange member with a keyed or splined axial opening disposed therethrough. The opening is configured to matingly engage with a second shaft which is keyed or splined and to permit a section of the second shaft to pass through the opening. A coupling plate is sandwiched between the flanged shaft and the keyed or splined flange member and is bolted to the flanged shaft. The coupling plate has a threaded opening disposed therethrough which engages the keyed or splined shaft adjacent the end thereof. The keyed or splined shaft then passes through the opening in the keyed or splined flange member and is retained in the coupling plate whereby linear displacement of the second shaft relative to the flanged shaft and coupling plate is prevented in a safe, secure and efficient manner. The flanged member is then screwed or bolted to the coupling plate (which is screwed or bolted to the flanged shaft) and thus transmits rotation of the flanged shaft to the second shaft in a safe, secure and efficient manner.

9 Claims, 5 Drawing Figures

U.S. Patent  Oct. 24, 1978  4,121,532
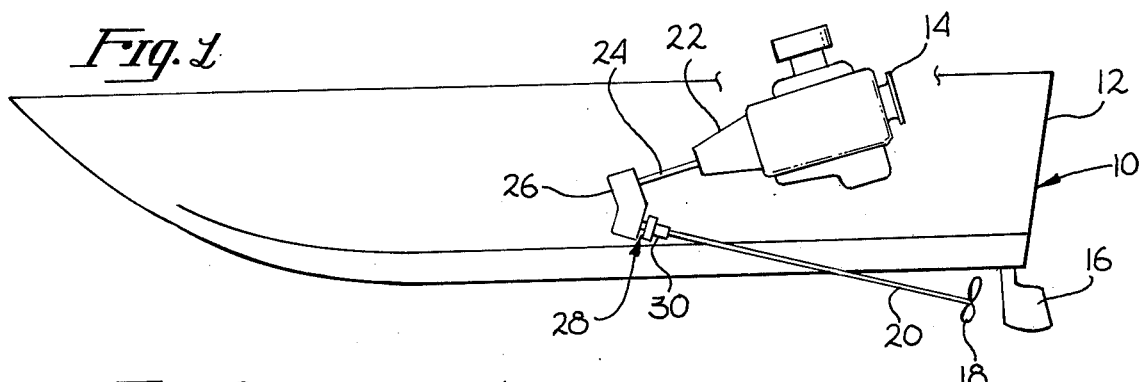
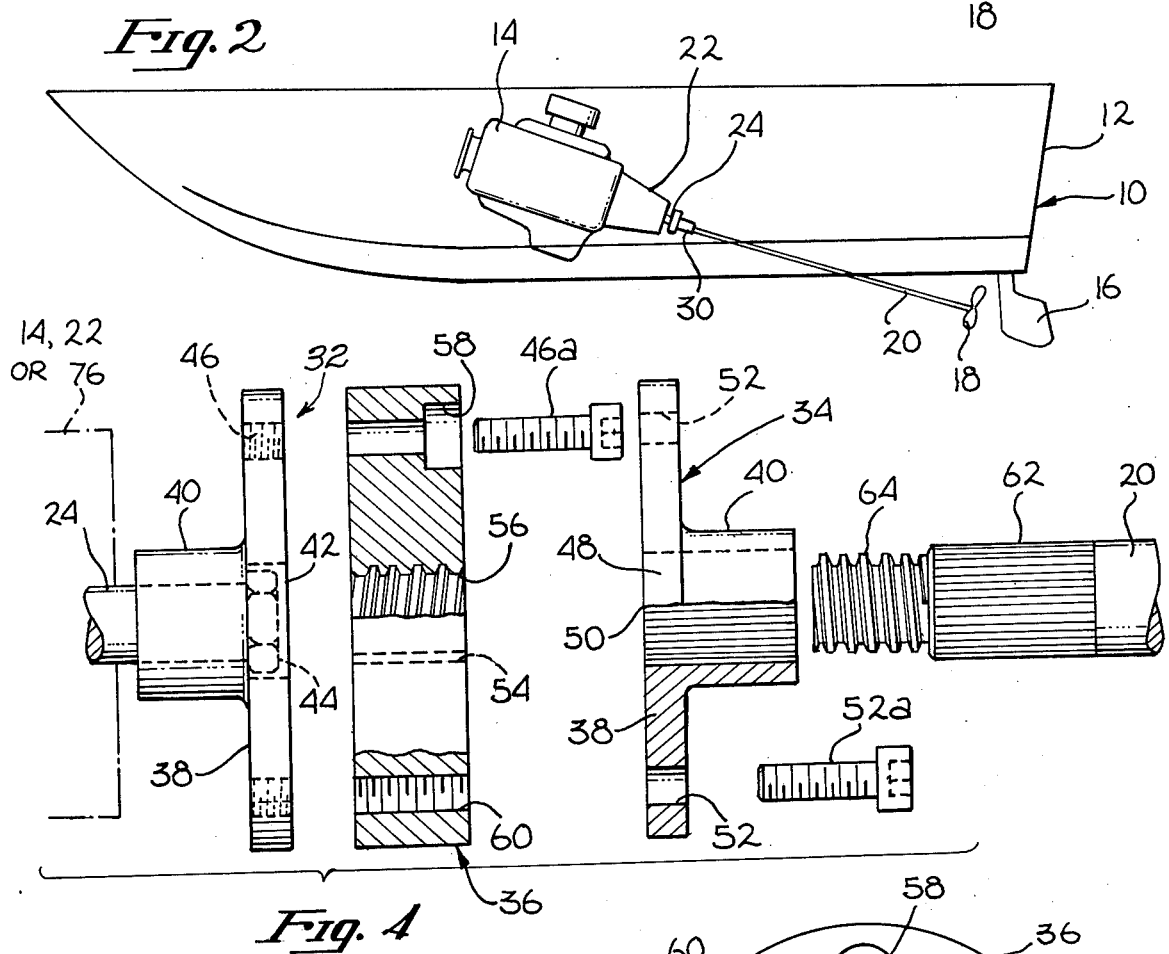
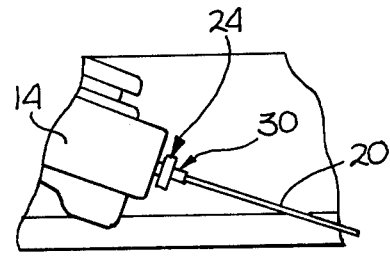
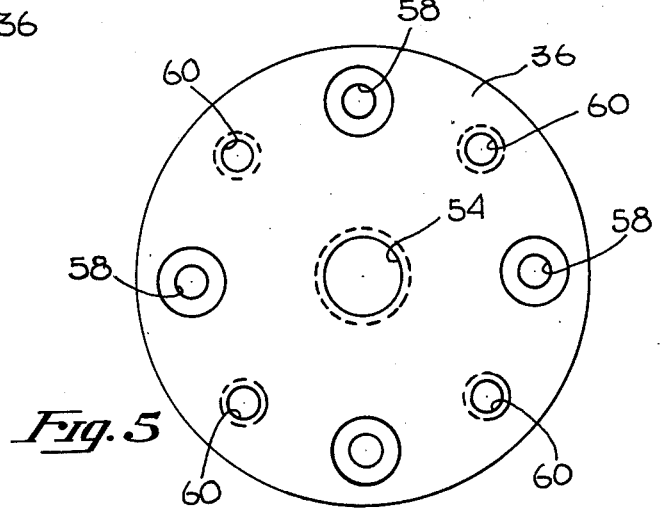

SPEEDBOAT SAFETY DRIVELINE COUPLING

BACKGROUND OF THE INVENTION

1. Field of the Invention

The present invention relates to the field of couplings, and more specifically, to driveline couplings having special utility in the marine industry.

2. Description of the Prior Art

In typical high performance boat applications, an engine is disposed in the boat, usually with an associated transmission and is coupled to a propeller driving shaft such that rotation of the driving shaft in the engine is transmitted to the propeller shaft thereby rotating the propeller. As the size and performance of such engine has increased, such as, for example, in high-performance or racing boats, the driveline coupling used to join the driveshaft with the propeller shaft has become extremely important. This is because to increase the efficiency of the boat it is helpful if all of the rotational energy of the driveshaft is transferred to the propeller shaft without such energy being lost. Because of the speed associated with such high preformance boats, and because of the general concern of safety, certain considerations must be taken into account in such driveline coupling which are generally not considered in other technologies. For example, it is know in the art that should the propeller shaft be loosened from the coupling, the propeller shaft could slide out of the boat during deacceleration and impinge upon the rudder. This has been known to cause not only a lack of speed but a loss of control of the boat which can result in destruction of the boat and harm to the occupants. However, early couplings were at odds with the safety factors in that it was found that an efficient means of coupling the prop shaft to the driveshaft was via a coupling whose safety considerations were not as extensive.

A typical shaft for coupling the driveshaft of an engine to the propeller shaft is disclosed by Coffing, U.S. Pat. No. 2,678,840. In Coffing, the propeller shaft is adapted to be received in the bore end of a hub member with the hub abutting a coupling plate. The hub is provided with axially extending keyways. Each of these keyways terminates short of the end of the shaft, the length conforming to the length of keys to be received therein so that the keys will be retained against axial displacement by the end of the keyways. The hub is provided with axial slots such that it can be coupled to the power shaft. A nut or other similar locking member is screwed onto the hub and is circumferentially disposed about the key. It should be noted, however, that such coupling device requires various sections to be gouged of the end of the propeller shaft which can have a tendency to weaken such shaft. In addition, complicated tooth locking members and associated keying members must be slip-fitted about the end of the propeller shaft. Finally, such shaft coupling does not take into consideration the longitudinal force associated with high performance boat couplings. That is, while such shaft coupling of Coffing may be sufficient to couple the prop shaft with the drive shaft in such a manner that rotation of the drive shaft causes the prop shaft to rotate, when the prop shaft is caused to deaccelerate quickly, such that there is a force vector along the length of the driveshaft, such coupling is not specifically designed to prevent the prop shaft from pulling out of the shaft coupling. This is a severe limitation, and as discussed hereinabove, should the prop shaft extend out from the boat, it could impinge upon the propeller and cause the aforementioned serious problems.

Other types of couplings are disclosed by Gredell, U.S. Pat. No. 2,585,113, Crowell, U.S. Pat. No. 281,618 and Swain, U.S. Pat. No. 140,600. These latter references, while being directed to shaft couplings, are not specifically designed or any way related to means for preventing both radial and longitudinal motion of the prop shaft such that retention of the prop shaft in the coupling is efficiently and safely maintained.

Thus, the prior art couplings, while they may be effective for coupling two shafts together, are of limited utility when the considerations are to prevent both longitudinal and undesirable radial rotation of the prop shaft especially during deacceleration thereof. The present invention provides an advancement in the art of shaft couplings and contains none of the aforementioned shortcomings associated with the prior art couplings. The present invention provides a flanged member and a coupling plate sandwiched between said flanged member and the boat's driveshaft, which solves the problem of permitting an efficient transfer of the energy from the driveshaft to the prop shaft but retains the prop shaft in such coupling even during rapid deacceleration of the prop shaft and boat.

BRIEF SUMMARY OF THE INVENTION

The present invention relates to couplings for use in speed boats and the like wherein such boats have one or more flanged power shaft(s) and associated propeller shaft(s). As discussed hereinabove, there is a long felt need for providing a coupling such that the power shaft and propeller shaft can be coupled together in an efficient manner but in a manner which does not put the occupants at their peril. The present invention provides a solution to this problem by providing the coupling with a flange member axially coupled to the propeller shaft. The propeller shaft has a splined section and a threaded section adjacent one end thereof. The splined section of the propeller shaft is configured such that the threaded portion of the propeller shaft extends through a splined hole in the flange member. A coupling plate is sandwiched between the flange member and the flanged power shaft and has a threaded hole axially disposed therethrough. In addition, various means, such as screws, bolts and the like, are used to join the flange member as well as the coupling plate together and to the flanged power shaft in a secure manner.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 1 is a cut-away view showing a typical boat having an engine and a v-drive gear box and shows the coupling of the propeller shaft to the output shaft of the v-drive gear box.

FIG. 2 illustrates a second embodiment of the present invention in which the transmission output shaft is directly coupled to the propeller shaft.

FIG. 3 illustrates a third embodiment of the present invention in which the engine crankshaft is directly coupled to the propeller shaft.

FIG. 4 is an exploded view of the safety coupling device of the present invention and shows the flanged power shaft, the flange member, the coupling plate, and the propeller shaft.

FIG. 5 is an end view of the coupling plate used to couple the second flange member to the flanged power shaft, or engine crankshaft.

DETAILED DESCRIPTION OF THE INVENTION

As discussed hereinabove, the present invention relates to a safety driveline coupling which is a device for coupling the propeller shaft of a typical inboard speed boat to the engine, transmission, or v-drive gear box such that the propeller shaft is safely secured to the engine, transmission, or v-drive gear box equally well under either acceleration, constant velocity or deacceleration. As discussed hereinabove, conventional devices used for coupling the propeller shaft to the engine, transmission, or v-drive gear box generally consists of mating companion flanges keyed to the propeller shaft with a square or woodruff-type key and secured with a set screw. This conventional arrangement works adequately under acceleration or steady forward speeds because the extreme forward end of the propeller shaft abuts against the companion flange of the engine, transmission, or v-drive gear box shaft and thus, the forward thrust from the propeller shaft is transmitted to the engine, transmission, or v-drive gear box.

The problem with this conventional arrangement is that under deacceleration, water impinging against the propeller tends to pull the propeller and propeller shaft away from the engine, transmission, or v-drive gear box. With the conventional prior art configuration, it takes a relatively little force to accomplish this in that all that retains the propeller shaft in the flange engaging the drive shaft is whatever slight interference fit may exist plus the friction created by a set screw if one is used. To assist the set screw in retaining the propeller shaft during deacceleration, some propeller shafts are notched such that a slight mechanical interlock exists to assist in retention of the shaft during deacceleration. As discussed hereinabove, this arrangement is poor at best, and thus the boat must be intentionally deaccelerated slowly or the propeller shaft will disengage from the propeller shaft flange and will be displaced aft towards the rudder of the boat. The present invention affords full transmission of forward thrust during acceleration and constant velocity and affords full transmission of rearward pull of the propeller and the propeller shaft during deacceleration. This is accomplished by a keyed or splined companion flange which slides over a matched keyway or spline on the forward end of the propeller shaft. At the extreme forward end of the propeller shaft, a male acme thread is cut such that the nominal diameter of the acme thread is equal to or slightly less that the root diameter of the keyed or splined shaft. The keyway or spline on the propeller shaft is cut with sufficient length to permit the propeller shaft flange to slide aft on the shaft enough so that the full length of the acme thread is exposed forward of the propeller shaft flange. A coupling plate which has a mating female acme thread cut axially therethrough and two radially disposed bolt patterns is coupled to a flange member disposed on the end of the power shaft. The forward end of the propeller shaft is now threaded onto the coupling plate. Once hand tight, the propeller shaft flange is slid forward to contact the coupling plate. The propeller shaft is backed off slightly until the bolt hole pattern in the propeller shaft flange is aligned with the threaded hole pattern in the coupling plate. Finally, the flange on the propeller shaft is bolted securely to the coupling plate which is affixed to the flange on the engine crankshaft or flanged powershaft of the transmision or v-drive gear box.

This arrangement provides excellent transmission of torque from the engine, transmission, or v-drive companion flange to the coupling plate via the bolts secured therein. And from there to the propeller shaft companion flange via the bolts secured therein, and finally to the propeller shaft via the key or spline, between the propeller shaft companion flange and the propeller shaft.

By the use of the present invention, forward thrust and rearward pull on the propeller shaft are both transmitted equally well from the male acme thread on the propeller shaft into the coupling plate and on to the engine, transmission, or v-drive gear box. This positive retention of the propeller shaft under deacceleration allows the boat to be deaccelerated as quickly as desired, a distinct safety feature, and eliminates the possibility of the propeller shaft becoming disengaged from the engine, transmission, or v-drive gear box and thus becoming interlocked with the rudder. In addition, the bolts that secure the propeller shaft companion flange to the coupling plate prevent rotation of the propeller shaft within or relative to the coupling plate. This eliminates almost all possibilities of the propeller shaft from dethreading from the coupling plate.

It should be noted that an acme thread is used between the forward end of the propeller shaft and the coupling plate because it has been found that an acme thread is particularly effective in transmitting linear thrust and need not be tightened to transmit thrust effectively. This is particularly important inasmuch as the propeller shaft is hand tightened into the acme thread and will almost always have to be backed off slightly to align the bolt holes in the propeller shaft companion flange with the threaded holes in the coupling plate. The acme thread is also particularly effective in transmitting thrust even when it is cut such that a loose fit exists between male and female elements of the acme thread. This is important when a spline, particularly an involute spline as used in the present invention is being used to transmit torque between the propeller shaft companion flange and the propeller shaft. A slightly loose acme thread will still transmit thrust effectively and will allow a very slight lateral displacement of the propeller shaft relative to the entire companion flange/coupling plate assembly. This slight lateral movement enables the male and female elements of the spline to center themselves perfectly so that the forces being transmitted by the spline are being shared equally by all of the teeth of the spline. This enables the spline to develop substantially increased torque flow capabilities not associated with the prior art.

Referring now to FIG. 1, one can see a typical boat 10 having a hull 12, an engine 14, a rudder 16, a propeller 18 coupled to an associated propeller shaft 20, a transmission 22 coupled to the engine 14 and a drive shaft 24 extending outwardly from such transmission 22. In FIG. 1, the first embodiment of the present invention shows the drive shaft 24 extending into a v-drive gear box 26. Such gear boxes are well known in the art and will not be described in detail herein. Extending from the v-drive gear box 26 is a second shaft 28, but for the purposes of simplicity, shaft 28 will be referred to herein as a power or drive shaft extension and is treated equivalently to a general driving or power shaft as hereinbelow described. Such drive shaft extension 28 is coupled to the novel safety drive line coupling 30 at one end thereof and at the other end thereof, propeller shaft 20 is coupled.

Referring now to FIG. 2, one can see that in substantially the same elements are present as described with reference to FIG. 1, except that in this second embodiment of the present invention, the drive shaft 24 does not enter any type of v-drive gear box but rather is directly coupled to the novel safety drive line coupling 30.

FIG. 3 shows yet another embodiment of the present invention and illustrates the fact that the coupling device 30 and uniquely shaped propeller shaft 20 can be directly coupled to a power source. In FIG. 3, the propeller shaft 20 is joined to the coupling 30 as in the other embodiments; however, in this embodiment, the crankshaft 24 of the engine 14 is directly coupled to the coupling member 30.

In any of the embodiments, however, one can see that should the propeller shaft 20 somehow become disengaged from the coupling 30, the propeller 18 would impinge directly upon the rudder 16 and thus could cause substantial damage either to the rudder and/or the propeller, and even perhaps lock the rudder and propeller such as would cause the boat 10 to go out of control and ultimately tip over. This damage, however, is substantially eliminated if not completely prevented by the novel coupling 30 of the present invention.

Referring now to FIGS. 4 and 5, the coupling 30 of the present invention is clearly shown. The driveline coupling 30 is comprised of a generally circular flange member 34, as well as a generally circular coupling plate 36. The drive shaft or crankshaft 24 of the engine 14 is flanged at the end thereof. This flange member 32 and flange member 34 are each comprised of a generally outwardly extending section 38 and a elongated shaft section 40 enabling the flange members to be coupled to a typical shaft. However, flange member 32 may also be an integral part of the shaft as would typically be the case in the embodiment shown in FIG. 3. In many prior art applications, it was necessary that the prop shaft 20 have such flange members directly made as a section of said shaft, i.e. an integral member, which would substantially increase cost of such shafts and would make installation extremely difficult. This is because the shaft 20 is extended up through the bottom of the boat through strut bearings and a stuffing box to support the shaft and to prevent water from entering the boat. Loading from the interior of the boat through the bottom would require the engine 14 to be removed. In addition, if the deck was shaped such that the shaft 20 could not be positioned at the proper angle, a hole may have to be cut in the deck in order to allow entry of the unflanged section of the shaft 20 through the bottom of the boat.

By the within invention, a substantially straight shaft may be used for the prop shaft 20 and flange member 34 can be separately, but directly coupled to the propeller shaft as hereinbelow described. Flange 32 of the power shaft 24 has a first set of screw or bolt holes 46 for coupling a uniquely designed coupling plate 36 thereto as hereinafter described. The flange member 34 also has an axial hole 48 extending therethrough which hole is internally splined or keyed in the axial direction (i.e. along the length of the hole 48). Such splining or keying is indicated therein as element 50. The outwardly extending section 38 of the second flange 34 has screw or bolt holes 52 disposed therethrough for coupling the flange member 34 to the coupling plate 36 as hereinafter described.

The coupling plate 36 has a generally circular configuration with an axial hole or opening 54 extending therethrough. Opening 54 is threaded as indicated by element 56 within an acme-type threading although other threadings are within the scope of the present invention. Coupling plate 36 has two sets of holes disposed therethrough. A first set of bolt holes 58 and a second set of screw holes 60 although members other than bolts and screws can be used for coupling the coupling plate to the flanged power shaft 24 and flange member 34. However, in the preferred embodiment, bolt holes 58 permit bolt members 46a to extend through the coupling plate 36 so as to join the coupling plate 36 to the flanged power shaft 24. Threaded screw holes 60 enable associated screw members 52a to be disposed through the flange member 34 and thus enable the flange member 34 to be coupled to the other side of the coupling plate 36.

Referring now specifically to FIG. 4, one can see that the propeller shaft 20 has, at one end thereof, an acme screw thread 64 adjacent to a splined or keyed section 62. In the preferred embodiment, the splined section 62 is an involute spline although other keying or splining configuraations are within the scope of the present invention. The spline section 62 is arranged and configured that it matingly engages with the splined area 50 located in hole 48 of the second flange member 34.

In a typical coupling operation, it will be assumed that the prop shaft 20 does not have the necessary splining or keying adjacent the end thereof. In such a situation, the propeller shaft 20 is threaded at one end thereof with an acme screw thread which is the preferable threading. Directly behind such threading and extending longitudinally along the shaft 20 a predetermined distance, the involute spline section 62 is notched into the shaft 20.

In installing the speedboat safety driveline coupling 30 of the present invention, the coupling plate 36 is coupled to the flange 32 via bolt members 46a disposed in bolt holes 58 and holes 46. Referring to FIG. 5, one can see that the coupling plate 36 has two sets of bolt patterns; one set of counter bored through holes 58 which align with the threaded holes 46 on the flanged power shaft 32 and another set of threaded holes 60 which align with the holes 52 on the flange member 34. After the coupling plate 36 is securely fastened to the flange 32, the flange member 34 is slid onto the propeller shaft 20 such that the splined or keyed area 50 in hole 48 of the flange member 36 mates with spline section 62 adjacent one end of the propeller shaft 20. Because the flange member 34 is not integral with propeller shaft 20, the propeller shaft 20 may be first installed through the bottom of the boat 10 from the exterior to the interior thereof. This greatly facilitates installation. The flange member 34 is slid onto the propeller shaft 20 in such a manner that the threaded area 64 adjacent the end of the propeller shaft 20 clearly extends through the hole 48. Threaded area 64 is now screwed into opening 54 in the coupling plate 36 such that the threaded area 64 mates with the female threaded area 56 in opening 54. Once the propeller shaft 20 is hand tight, the flange member 34 is slid forward to contact and abutt against the coupling plate 36. The propeller shaft 20 is now rotated slightly until the bolt hole pattern 52 in the flange member 34 mates with the pattern 60 on the coupling plate 36. When in proper alignment, bolts 52a are disposed through holes 52 and 60 so as to secure the second flange 34 to the coupling plate 36.

By the use of the novel driveline coupling 30 of the present invention, forward thrust and rearward pull on the propeller shaft 20 are both transmitted equally well from the thread 64 on the propeller shaft 20 into the coupling plate 36 and on into the flange member 32 on the power shaft 24. Thus, because of the positive retention of the propeller shaft 20, should the boat 10 deaccelerate, the propeller shaft 20 is prevented from pulling out of the coupling assembly 30 because of the threaded area 64. In addition, positive drive action under acceleration is insured because of the splined or keyed section 62 on the propeller shaft 20. Thus, even under forward thrust and rearward pull, the forces on the propeller shaft are transmitted equally well such that the shaft 20 remains retained in the driveline coupling assembly 30.

It should also be noted the should the propeller shaft 20 break or should a different shaft be desired, one need only remove bolts 52a in order to render propeller shaft 20 easily removable, and then remove flange member 34, place it on a different shaft and repeat the above described procedures for installation.

It should be understood that while the preferred examples have been described herein, it will be apparent to one skilled in the art that other changes and modifications can be made without departing from the spirit or scope of the present invention as defined and claimed herein.

What is claimed is:

1. In a boat having an engine and a power shaft, the improvement which comprises a safety coupling device for coupling said power shaft to a shaped propeller shaft such that the rotation of one shaft is efficiently and safely transferred to the other shaft, said coupling device comprising a flange member having an axial opening disposed therethrough, said opening configured to matingly engage said propeller shaft and to permit a section of said propeller shaft to pass through said opening, and a coupling plate selectively connected to said flange member, said coupling plate having (i) means for joining said coupling plate to said section of said propeller shaft which extends through said opening in said flange member, and (ii) means for joining said coupling plate to said flange member and to said power shaft such that said coupling plate is independently coupled to both said flange member and to said power shaft whereby rotation of said power shaft is transmitted to said propeller shaft.

2. A coupling device in accordance with claim 1 wherein said propeller shaft is screw fitted into said coupling plate.

3. A coupling device in accordance with claim 1 where said coupling plate is a generally circular member having a threaded hole extending therethrough, said threaded hole for engaging said propeller shaft adjacent the end thereof.

4. A safety coupling device for use in coupling a power shaft to a transmitting shaft, said coupling device comprising (i) a flange member with one end of said transmitting shaft passing through said flange member and being matingly engaged therein, said shafts and said flange member arranged so as to be in axial alignment, (ii) a coupling plate selectively connected to and abutting against said flange member sandwiched between said flange member and said power shaft, and having a threaded hole extending therethrough, said end of said transmitting shaft disposed in said threaded hole and retained therein, and (iii) means for securing said coupling plate to said power shaft and to said flange member such that said coupling plate is independently coupled to both said flange member and to said power shaft.

5. A coupling device in accordance with claim 4 wherein said flange member has a splined opening which engages a splined area on said transmitting shaft adjacent the end thereof, said splined opening permitting a section of said transmitting shaft to pass therethrough and into said threaded hole in said coupling plate.

6. In a boat having an engine and a power shaft having a flanged section at one end thereof, the improvement which comprises:

a. a propeller shaft having a shaped joining member at one end thereof, and b. a safety coupling device for coupling said power shaft to said propeller shaft, said coupling device comprising a coupling plate axially coupled to said power shaft, and a flange member axially coupled to said coupling plate and said propeller shaft, said coupling plate abuting against and sandwiched between said flanged section on said power shaft and said flange member, and having a hole axially disposed therethrough, said shaped joining member of said propeller shaft being disposed through said flange member and into said hole in said coupling plate and retained therein; and c. means for securing said power shaft and said flange member to said coupling plate.

7. A coupling device in accordance with claim 6 wherein said shaped joining member of said propeller shaft is a splined section and a threaded section, said joining member of said propeller shaft configured such that said threaded portion of said propeller shaft extends through a hole in said flange member and is retained in said hole in said coupling plate, and said splined section of said propeller shaft is matingly engaged in said hole in said flange member.

8. A safety coupling device and associated shaft for use in coupling a power shaft having a flanged section adjacent one end thereof to a transmitting shaft, said coupling device comprising (i) a flange member with one end of said transmitting shaft passing through said flange member and being matingly engaged therein, said shafts and said flange member arranged so as to be in axial alignment, (ii) a coupling plate selectively connected to and abuting against said flange member sandwiched between said flange member and said power shaft, and having a threaded hole extending therethrough, said end of said transmitting shaft disposed in said threaded hole and retained therein, and (iii) a first means for securing said coupling plate to said power shaft and a second means for securing said coupling plate to said flange member, said first and second means each comprising a plurality of bolt members, said first means extending out of said coupling plate and into said flanged section of said power shaft and said second means extending from said flange member and into said coupling plate so as to circumferentially surround said threaded hole in said coupling plate.

9. In a boat having an engine and a power shaft having a flanged section at one end thereof, the improvement which comprises:
 a. a propeller shaft having a shaped joining member at one end thereof, and
 b. a safety coupling device for coupling said power shaft to said propeller shaft, said coupling device comprising a coupling plate axially coupled to said power shaft, and a flange member axially coupled to said coupling plate and said propeller shaft, said coupling plate abuting against and engaged by and sandwiched between said flanged section on said power shaft and said flange member, and having a hole axially disposed therethrough, said shaped joining member of said propeller shaft being disposed through said flange member and into said hole in said coupling plate and retained therein; and
 c. a first and second plurality of bolt members disposed through said flanged section on said power shaft and said flange member respectively and into said coupling plate so as to circumferentially surround said propeller shaft when disposed in said coupling plate, said first plurality extending from said coupling plate into said flanged section on said power shaft, and said second plurality extending from said flange member into said coupling plate.

* * * * *